United States Patent Office 3,002,977
Patented Oct. 3, 1961

3,002,977
ETHYL 2-(2-CYCLOHEXENYLTHIO)-4-THIAZOLECARBOXYLATE
John J. D'Amico, Charleston, W. Va., assignor to Monsanto Chemical Company, St. Louis, Mo., a corporation of Delaware
No Drawing. Filed June 30, 1960, Ser. No. 39,782
1 Claim. (Cl. 260—302)

This invention relates to ethyl 2-(2-cyclohexenylthio)-4-thiazolecarboxylate which may be prepared as follows: To a stirred solution comprising 32 grams (0.169 mole) of ethyl 2-mercapto-4-thiazolecarboxylate, 11.1 grams (0.169 mole) of 85% potassium hydroxide and 200 ml. of ethyl alcohol was added in one portion 27.2 grams (0.169 mole) of 3-bromocyclohexene. An exothermic reaction set in causing the temperature to rise from 25° to 48° C. After stirring at 25–30° C. for 24 hours, 200 ml. of water and 300 ml. of ether were added. The ether solution was separated, washed with water until neutral to litmus and dried over sodium sulfate. The ether was removed in vacuo at a maximum temperature of 80–90° C. The product was obtained in 61.5% yield as an amber oil. Analysis gave 4.8% nitrogen and 23.9% sulfur as compared to 5.2% nitrogen and 23.8% sulfur calculated for $C_{12}H_{15}NO_2S_2$.

The product is an intermediate for synthesis of more complex molecules and is an effective miticide. Activity was demonstrated against the two-spotted spider mite, *Tetranychus telarius* (L.). An aqueous emulsion containing 0.1% of ethyl 2-(2-cyclohexenylthio)-4-thiazolecarboxylate was employed for dipping thereinto infested leaves of plants. Contact effects were observed on the infested leaves. On the dipped infested plants 95% kill of all stages of the spider mite was obtained.

It is intended to cover all changes and modifications of the examples of the invention herein chosen for purposes of disclosure which do not constitute departures from the spirit and scope of the invention.

What is claimed is:

Ethyl 2-(2-cyclohexenylthio)-4-thiazolecarboxylate.

No references cited.